Patented Aug. 2, 1932

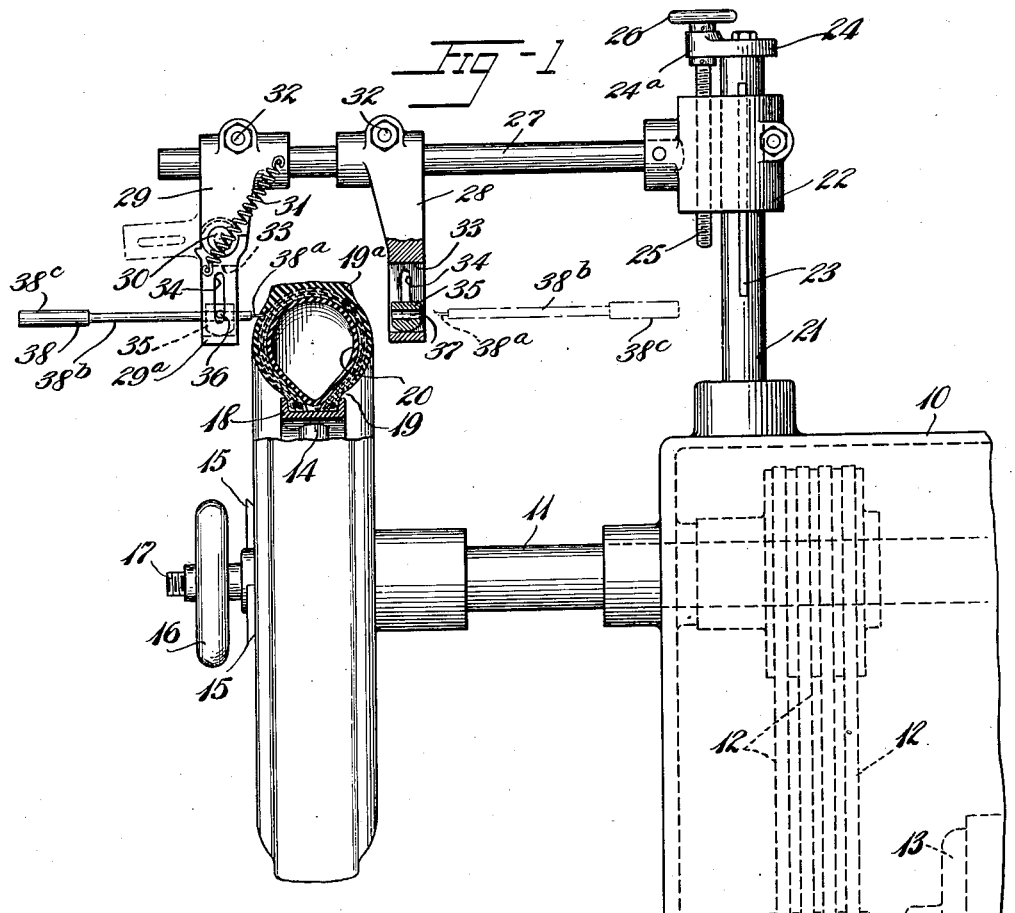
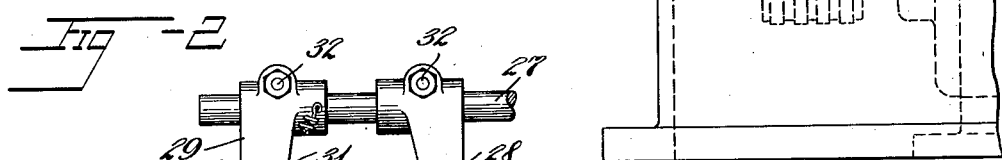

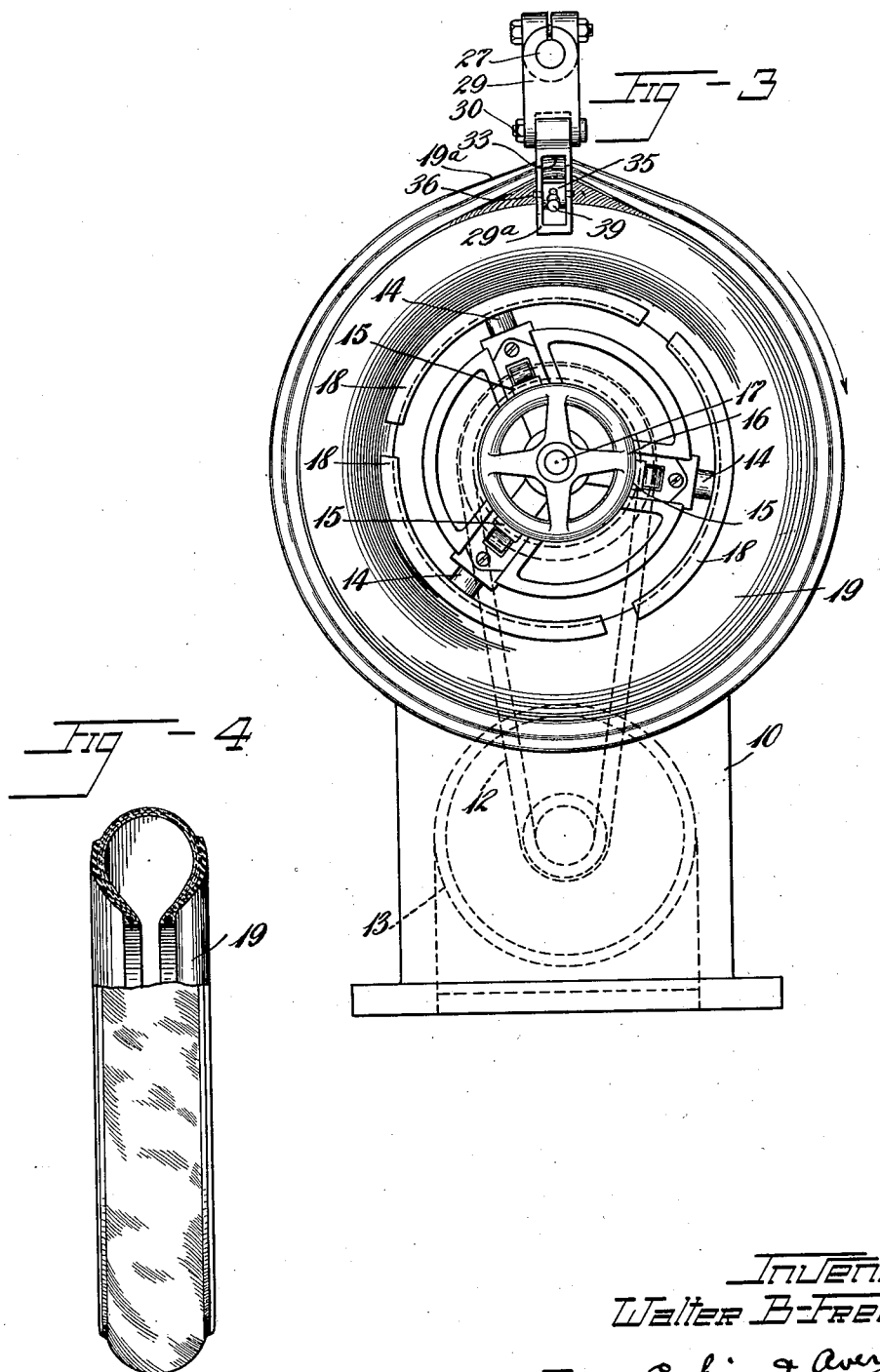

1,869,680

UNITED STATES PATENT OFFICE

WALTER B. FREEMAN, OF AKRON, OHIO, ASSIGNOR TO THE B. F. GOODRICH COMPANY, OF NEW YORK, N. Y., A CORPORATION OF NEW YORK

METHOD AND APPARATUS FOR REMOVING TREADS FROM TIRES

Application filed December 22, 1928. Serial No. 328,007.

This invention relates to methods and apparatus for removing treads from tires, and especially to procedure and means for removing defective or worn treads from pneumatic tire casings so that the latter subsequently may be re-treaded.

The chief objects of the invention are to provide in an improved manner for the rapid and economical removal of treads from tire casings; and to effect such removal of the tread without damaging the fabric plies of the tire carcass. Other objects will be manifest as the specification proceeds.

Of the accompanying drawings:

Fig. 1 is front elevation of apparatus embodying and adapted to carry out my invention in its preferred form, and the work therein, at the initial stage of operation, parts being broken away and in section.

Fig. 2 is similar view of a portion of the apparatus and the work at a subsequent stage of operation.

Fig. 3 is a side elevation of the apparatus shown in Fig. 1 at substantially the stage of operation shown in Fig. 2.

Fig. 4 is a front elevation, with a part broken away and a part in section, of a tire casing with the tread portion removed.

Referring to the drawings, I show at 10 a suitable framework provided with an outwardly-extending rotatable spindle 11 which is driven by any suitable means such as the belts 12, 12 and motor 13. Mounted upon the outer end of the spindle 11 is a chuck which includes radial pins 14, 14 adapted to be moved inward and outward by respective wedge shaped members 15, 15 whose movement is controlled by a handwheel 16 threaded onto a screw 17 formed on the end of the spindle 11. The outer ends of the pins 14 are provided respectively with arcuate, laterally-flanged members 18, 18 adapted to engage the inner periphery and bead portions of a pneumatic tire, such as the tire 19, substantially throughout the entire area thereof, to support the tire upon the rotatable spindle.

In order that the tire may resist collapse during the tread removing operation, it is supported preferably by internal pressure as by the inflated inner tube 20 as shown, or it may be supported by other suitable means such as an expansible core or "water bag", or by a sectional rigid core such as is used for building tires. The tread portion of the tire, which is to be removed, is designated 19$^a$.

Rising from the top of the framework 10 directly above the spindle 11 is a vertical post 21 upon which a bracket 22 is slidably mounted for vertical movement, said post being provided with a feather 23 for preventing angular movement of said bracket. The post 21 has its upper end provided with a cap 24 formed with an outstanding apertured ear 24$^a$ through which freely extends a screw 25 which has its lower end threaded through the bracket 22, and its upper end provided with a knob or hand-wheel 26 by which the screw is manually rotated to raise or lower said bracket to accommodate the apparatus to tires of various diameters.

Supported from the bracket 22 and extending parallel to the spindle 11 and transversely of the tire 19 is a tool-supporting bar 27 upon which are mounted a pair of tool-supporting brackets 28, 29 extending toward the tire at the respective sides thereof, the bracket 29, at the outer side of the tire, having an articulated end portion 29$^a$ to permit the mounting and removal of the tire from the chuck. The articulated end portion 29$^a$ of the bracket 29 is pivoted to the latter at 30, and a tension spring 31 connecting said bracket and end portion is provided for urging the latter toward normal operative position or for holding it in the raised, inoperative position indicated by broken lines in Fig. 1, the spring in either case being overcenter. Both brackets 29, 28 are adapted to be secured in adjusted positions laterally of the tire by means of bolts 32 which clamp them upon the bar 27.

The end portion of the bracket 28 and the end portion 29$^a$ of the bracket 29 are formed with respective closed-end, through slots 33, 33 disposed in a plane transverse to the plane of the tire 19. Narrower and shorter slots 34, 34, transverse to the slots 33, are formed in the walls of the brackets 28, 29 on each side of the slots 33.

Slidably mounted in the slots 33 are respective tool-holding guide-blocks 35, 35 and each block is formed with lateral trunnions 36, 36 which extend through respective slots 34. One side of each guide-block is rounded as shown to permit angular movement while it is in its lowermost position. Each guide-block is formed with a suitable bore 37 adapted freely to accommodate a generally cylindrical tool, said bores lying in the plane of the slots 33.

Two tools are provided for use with the apparatus, a cutting tool 38 and a ply-separating tool 39, which are used successively in the removing of a tread from a tire. The cutting tool comprises a short knife-blade 38$^a$ mounted in the end of a cylindrical holder 38$^b$ which is provided with a handle 38$^c$. The ply-separating tool 39 comprises a cylindrical rod or bar 39$^a$ provided with a handle 39$^b$, the work-engaging end of the tool 39 being tapered and having a rounded or blunt nose.

The method of practicing my invention with the apparatus described is as follows. The end portion 29$^a$ of the bracket 29 being in the inoperative broken-line position of Fig. 1, a tire 19 to be treated is mounted upon the retracted flanged members 18 of the chuck, which members are then moved radially outward to engage the tire firmly, after which the tire is distended, as by inflating the inner tube 20 therein. The end portion 29$^a$ is then restored to the operative full-line position of Fig. 1 and the motor 13 is started to rotate the tire 19.

The cutting tool 38 is then thrust through the aperture or bore 37 in one of the guide-blocks 35 and manually fed against the sidewall of the tire, at the margin of the tread 19$^a$ thereon, until the blade 38$^a$ penetrates the rubber of the side wall of the tire, making a circumferential incision therein, the feed of the blade being stopped at the outer carcass ply of the tire. The operation as described is then repeated on the opposite side of the tire.

Next the separating tool 39 is mounted in one of the guide-blocks 35 and its nose thrust into the circumferential incision in the tire made by the blade 38$^a$. Continued thrust upon the tool causes it to enter between the tread portion and carcass portion of the tire and progressively to separate the same in a circumferential and transverse direction, the slidable and pivotal mounting of the guide-block 35 permitting the tool to be positioned substantially tangential to the tire-carcass throughout substantially its entire range of movement in passing from the margin of the tread to the crown of the tire, as shown in Fig. 2, and at the same time causes the circumferential force of the rotating tire to be taken by the bar 27. The operation as described is repeated on the opposite side of the tire to effect complete separation of the tread and carcass, and the tread may then be removed from the tire which will present the appearance shown in Fig. 4. The tire may then be retreaded or otherwise disposed of.

The invention permits the rapid removal of worn or damaged treads from tires, and the carcass plies are in no way ruptured or damaged, since the tread is torn rather than cut from the tire. The arrangement of the tool-holding members is such as to cause them to take much of the strain on the tools caused by the rotation of the tire, with the result that the labor involved is not of an arduous character.

My invention may be modified within the scope of the appended claims.

I claim:

1. The method of removing treads from pneumatic tire casings which comprises rotating the inflated tire and during the rotation thereof feeding a rounded ply-separating tool progressively between the tread and carcass to effect separation thereof by tearing as the tire is so rotated.

2. A method as defined in claim 1 in which the tool progresses from a lateral edge of the tread transversely thereof.

3. The method of removing treads from pneumatic tire casings which comprises rotating the tire, and during the rotation thereof progressively feeding a rounded ply-separating tool between the tread and carcass thereof to tear the tread from the carcass while maintaining the tool substantially tangential to said carcass.

4. The method of removing treads from pneumatic tire casings which comprises inflating the tire to impart resilience thereto, rotating the tire on its own axis, and during the rotation thereof effecting a tearing separation of the tread and tire carcass progressively in a circumferential and transverse direction with relation to the tire.

5. A method as defined in claim 4 including the step of forming a circumferential incision in the tire from which incision the separating operation is initiated.

6. In apparatus for removing treads from tires, the combination of means for supporting and rotating a tire, a tool mounting at one side of the tire and formed with a slot, a guide-block slidably mounted in said slot, and a tool slidably mounted in said guide block.

7. Apparatus as defined in claim 6 in which the guide-block is angularly movable in its slot.

8. The method of removing a tread member from a pneumatic tire casing which comprises cutting through the sidewall to the fabric portion, internally supporting the fabric portion by inflation so as to permit resilient deflection thereof, inserting a rounded ply-separating tool between the tread and the fabric portion and causing a relative rotative movement between the tire and the tool to progressively separate the tread from the fabric portions.

9. The method of removing a tread from a pneumatic tire casing which comprises rotating the tire on its axis while internally supporting the carcass thereof by inflation so as to permit resilient deflection thereof, making a circumferential incision at each side of the tread, and causing separation of the carcass and tread by progressive insertion of a rounded ply-separating tool therebetween during the rotation of the tire.

10. The method of removing a tread member from a pneumatic tire casing which comprises inflating the tire to support the fabric portion thereof by inflation so as to permit resilient deflection thereof, rotating the tire on its axis, making a circumferential incision at the edge of the tread portion, and progressively deflecting portions of the tread outwardly to cause progressive separation of the tread and the fabric from the line of incision during said rotative movement.

11. The method of removing a tread member from a pneumatic tire casing which comprises cutting through the sidewall to the fabric portion at the edges of the tread, supporting the fabric portion from within by inflation so as to permit resilient deflection thereof, rotating the tire on its axis, and during the rotation thereof progressively deflecting portions of the tread outwardly to cause progressive separation of the tread and fabric portion.

In witness whereof I have hereunto set my hand this 19th day of December, 1928.

WALTER B. FREEMAN.